United States Patent
Yang et al.

(10) Patent No.: US 9,965,997 B2
(45) Date of Patent: May 8, 2018

(54) SEQUENCE CONTROLLED TIMING CONTROLLER, BRIDGE INTEGRATED CIRCUIT, AND METHOD OF DRIVING THEREOF

(71) Applicant: LG DISPLAY CO., LTD., Seoul (KR)

(72) Inventors: SuBin Yang, Goyang-si (KR); Keunho Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 1 day.

(21) Appl. No.: 15/197,034

(22) Filed: Jun. 29, 2016

(65) Prior Publication Data

US 2017/0004761 A1 Jan. 5, 2017

(30) Foreign Application Priority Data

Jun. 30, 2015 (KR) .................. 10-2015-0092886

(51) Int. Cl.
*G09G 3/20* (2006.01)
*G06F 3/147* (2006.01)

(52) U.S. Cl.
CPC .......... *G09G 3/2096* (2013.01); *G06F 3/147* (2013.01); *G09G 2310/08* (2013.01); *G09G 2360/08* (2013.01); *G09G 2370/04* (2013.01)

(58) Field of Classification Search
None
See application file for complete search history.

(56) References Cited

U.S. PATENT DOCUMENTS

2016/0343355 A1* 11/2016 Kim .................. G09G 5/003

* cited by examiner

*Primary Examiner* — Gustavo Polo
(74) *Attorney, Agent, or Firm* — Birch, Stewart, Kolasch & Birch, LLP

(57) ABSTRACT

Provided are a sequence controlled timing controller, a bridge integrated circuit, and a method of driving thereof. The bridge integrated circuit which controls an interface unit, an image converting unit, and a transceiver to transmit image to the timing controller when a loading completed signal is received from the timing controller can be provided. Further, the method of driving the bridge integrated circuit and the timing controller to transmit and receive the loading completed signal so that the bridge integrated circuit converts image data and transmits the converted image data to the timing controller can be provided.

7 Claims, 8 Drawing Sheets

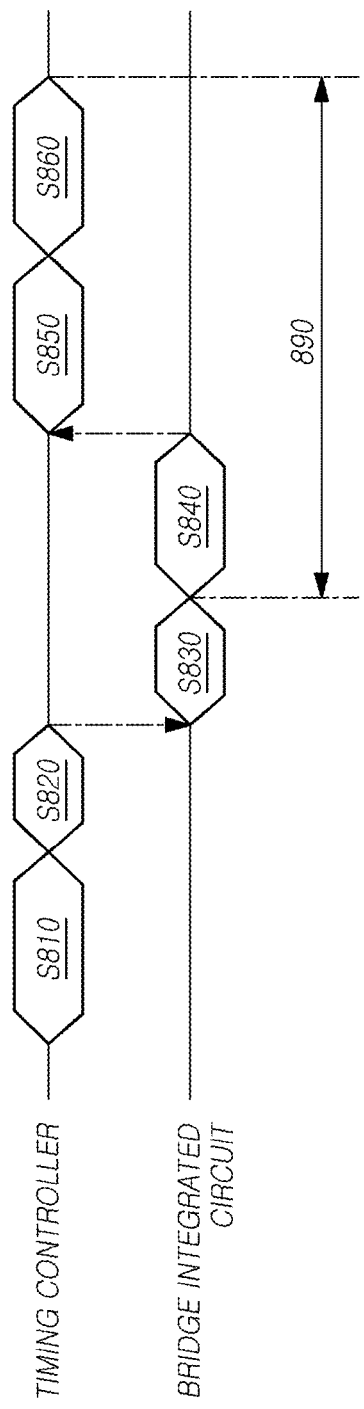

SEQUENCE CONTROLLED TIMING CONTROLLER, BRIDGE INTEGRATED CIRCUIT, AND METHOD OF DRIVING THEREOF

CROSS-REFERENCE TO RELATED APPLICATIONS

This application claims priority from Korean Patent Application No. 10-2015-0092886, filed on Jun. 30, 2015, which is hereby incorporated by reference for all purposes as if fully set forth herein.

BACKGROUND OF THE INVENTION

Field of the Invention

The present invention relates to a sequence controlled timing controller, a bridge integrated circuit, and a method of driving thereof.

Description of the Related Art

A display device of the related art includes a panel formed by gate lines and data lines intersecting each other, a gate driver which drives the gate lines formed on the panel, a data driver which drives the data lines formed on the panel, and a timing controller which controls driving timings of the gate driver and the data driver.

A display panel which configures a liquid crystal display (LCD) device or an organic light-emitting diode (OLED) display device uses a gate driving circuit which supplies a scan signal to the gate lines and a data driving circuit which supplies a data voltage to the data lines to display an image.

In the meantime, when image data which may be processed by the timing controller described above is different from image data which is supplied by a host system in the display device of the related art, a bridge integrated circuit which converts the data may be located between the timing controller and the host system. Even though the bridge integrated circuit and the timing controller are separately provided, the bridge integrated circuit and the timing controller need to continuously convert the image supplied by the host system to output the image to the panel. Therefore, it is necessary to adjust a sequence between the bridge integrated circuit and the timing controller to be equal.

However, the sequence needs to be adjusted while driving the devices, which may easily cause an error. Therefore, it takes a lot of time to adjust the sequence between the two devices. Accordingly, a configuration which controls the operation between the two devices to adjust the sequence is desired.

SUMMARY OF THE INVENTION

An aspect of the present invention is to control a sequence between a timing controller and a bridge integrated circuit to suppress a screen error. Another aspect of the present invention is to provide a sequence controlled timing controller, a bridge integrated circuit, and a method of driving the same, which address the limitations and problems associated with the related art.

Further, another aspect of the present invention is to remove an unnecessary signal control process between the timing controller and the bridge integrated circuit.

Furthermore, still another aspect of the present invention is to allow the bridge integrated circuit to supply image data after loading the timing controller.

According to an aspect of the present invention, there is provided a bridge integrated circuit which controls an interface unit, an image converting unit, and a transceiver to transmit image data to a timing controller when a loading completed signal is received from the timing controller.

According to another aspect of the present invention, there is provided a timing controller which confirms a status of a transceiver, a converting unit, and a panel controller to control the transceiver, the converting unit, and the panel controller to transmit a loading completed signal to a bridge integrated signal.

According to another aspect of the present invention, there is provided a method of driving a timing controller and a bridge integrated circuit including reading out information of a memory to load a panel controller and a converting unit when an input voltage is applied to the timing controller; receiving, by a control unit of the timing controller, a signal indicating that the loading is completed, from the panel controller and the converting unit; transmitting, by the timing controller, the received loading completed signal to a bridge controller; loading the bridge controller; and converting first image data which is received from a host system by the bridge controller into second image data to transmit the second image data to the timing controller.

As described above according to one or more embodiments of the present invention, a sequence between the timing controller and the bridge integrated circuit may be controlled.

Further, according to one or more embodiments of the present invention, the bridge integrated circuit operates after loading the timing controller so that a redundant operation of the bridge integrated circuit which unnecessarily generates a signal or converts the image data may be removed.

Further, according to one or more embodiments of the present invention, the bridge integrated circuit converts image data after loading the timing controller and supplies the converted image data to the timing controller. Therefore, a loss of the image data converted by the bridge integrated circuit may be avoided.

BRIEF DESCRIPTION OF THE DRAWINGS

The above and other aspects, features and other advantages of the present invention will be more clearly understood from the following detailed description taken in conjunction with the accompanying drawings, in which:

FIG. 8 is a view illustrating timing between a timing controller and a bridge integrated circuit according to an exemplary embodiment of the present invention.

DETAILED DESCRIPTION OF THE PREFERRED EMBODIMENTS

Figure 1:
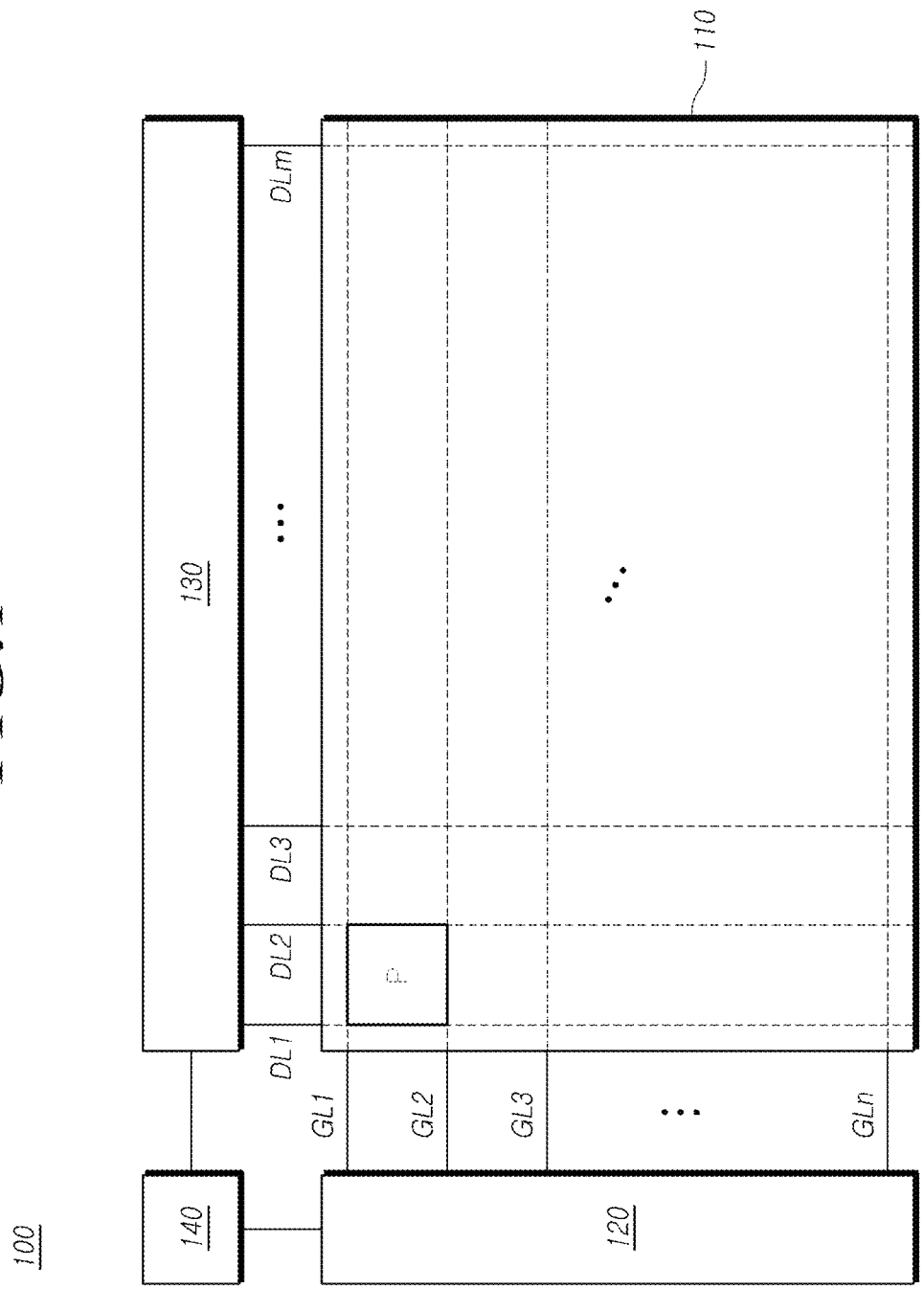
FIG. 1 is a schematic system configuration view of a display device 100 for applying the present exemplary embodiments of the present invention.

Hereinafter, some embodiments of the present invention will be described in detail with reference to the accompanying drawings. When reference numerals refer to components of each drawing, although the same components are illustrated in different drawings, the same components are referred to by the same reference numerals as possible. Further, if it is considered that description of related known configuration or function may cloud the gist of the present invention, the description thereof will be omitted.

Further, in describing components of the present invention, terminologies such as first, second, A, B, (a), (b), and the like may be used. The term is used to distinguish a component from the other component but a nature, an order, or the number of the components is not limited by the terminology. If it is described that a component is "connected" or "coupled" to another component, it is understood that the component is directly connected or coupled to the other component but another component may be "connected" or "coupled" between the components.

FIG. 1 is a schematic system configuration view of a display device 100 to which the present exemplary embodiments of the present invention are applied.

Referring to FIG. 1, the display device 100 for applying exemplary embodiments includes a panel 110 formed by gate lines GL1 to GLn and data lines DL1 to DLm intersecting each other, a gate driver 120 which drives the gate lines formed on the panel 110, a data driver 130 which drives the data lines formed on the panel 110, and a timing controller 140 which controls driving timings of the gate driver 120 and the data driver 130.

On the panel 110, the gate lines GL1 to GLn and the data lines DL1 to DLm intersect each other to define pixels P.

The gate driver 120 sequentially supplies a scan signal to the gate lines GL1 to GLn to drive the gate lines GL1 to GLn. To this end, x (x is a natural number which is equal to or larger than 2) clock signals are input to the gate driver. The gate driver sequentially supplies the scan signals to the gate lines based on the clock signals.

For example, the display device 100 of FIG. 1 may be a liquid crystal display device or an organic light-emitting diode display device. However, the display device 100 is not limited thereto and may be any type of display device if the display device includes the panel 110, the gate driver 120, the data driver 150, and the timing controller 140 and the gate driver uses a clock signal to drive the gate lines G11 to GLn. Further, the display device 100 of FIG. 1 may be a display device of a mobile terminal having a narrow bezel as the most important element.

An exemplary embodiment of a gate driver control signal which controls the gate driver may include a gate start signal VST and a gate clock. The signals are generated in the timing controller 140 to be supplied to a plurality of gate drive integrated circuits (IC) included in the gate driver.

The timing controller 140 is configured on a source printed circuit board (PCB). The gate drive integrated circuit (hereinafter, referred to as a "gate drive IC") is connected to a display panel in a tape automated bonding (TAB) manner or configured on the display panel in a chip on glass (COG) manner or electrically connected to the display panel in a chip on film (COF) manner.

The timing controller 140 supplies a gate start pulse through a gate start pulse line GSPL formed on a substrate of the display panel, supplies a gate shift clock through a gate shift clock line GSCL, and supplies a gate output enable signal through a gate output enable signal line GOEL.

The timing controller 140 receives image data from a host system. In this case, the bridge integrated circuit converts the image data of the host system and the timing controller 140 receives the converted image data from the bridge integrated circuit.

The exemplary embodiments may be applied to a display device in which a liquid crystal display panel or an organic light emitting display panel is coupled, but is not limited thereto.

Figure 2:
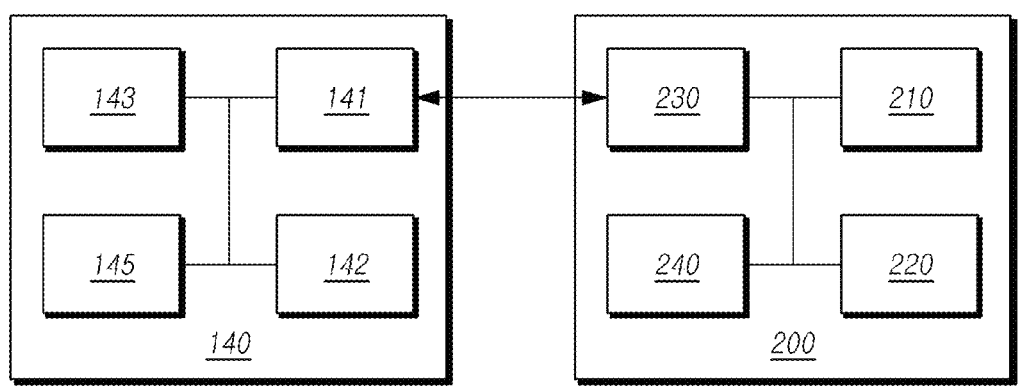
FIG. 2 is a view illustrating a relationship between a bridge integrated circuit and a timing controller for applying the present exemplary embodiments of the present invention.

FIG. 2 is a view illustrating a relationship between a bridge integrated circuit and a timing controller for applying the exemplary embodiments of the present invention.

As shown in FIG. 2, the bridge integrated circuit 200 is configured by an interface unit 210 which receives image data from the host system, an image converting unit 220 which converts the image data (first image data) received from the host system into image data (second image data) suitable for the timing controller, a transceiver 230 which transmits the converted image data (second image data) to the timing controller 140 and transmits and receives a signal to and from the timing controller 140, and a control unit 240 which controls the above-mentioned components. The bridge integrated circuit 200 is referred to as a bridge board, a bridge PCB, or a bridge IC.

Further, when the transceiver 230 receives a loading completed signal from the timing controller 140, the control unit 240 controls the interface unit 210, the image converting unit 220, and the transceiver 230 to transit the second image data to the timing controller 140.

The image data which is transmitted by the bridge integrated circuit 200 is not output to the display panel until the timing controller 140 is completely loaded. Further, when the bridge integrated circuit 200 transmits the image before loading the timing controller 140, the sequences between the timing controller 140 and the bridge integrated circuit 200 are not consistent. Therefore, it may further take a time to make the sequences between the two devices consistent. Therefore, a separate image converting job is not performed until the bridge integrated circuit 200 receives a signal. After receiving a loading completed signal (for example, T-con Done signal) indicating that the timing controller 140 is loaded, the image converting and transmitting job is performed to solve the sequence inconsistency between the timing controller 140 and the bridge integrated circuit 200.

The timing controller 140 receives image data from the bridge integrated circuit 200 and controls the transceiver 141 which transmits and receives the signal to and from the bridge integrated circuit, the converting unit 142 which converts the image data into panel image data such as a data voltage to be output to the display panel, and a panel controller 143 which controls the gate driver and the data driver of the display panel, applies the converted panel image data from the data driver to the display panel, and controls the gate signal to be generated, and the control unit 145 which controls the above-mentioned components. The panel controller 143 transmits a gate control signal and a data control signal to the gate driver and the data driver, respectively to output the panel image data converted by the converting unit 142 to the display panel.

The control unit 145 checks status of the components (the transceiver, the converting unit, and the panel controller) required to operate the timing controller 140. When the loading is completed, the control unit 145 controls the transceiver 141 to transmit the loading completed signal to the bridge integrated circuit, The timing controller 140 may generate panel image data corresponding to a data voltage which is applied to a transistor of each sub pixel of the display panel to display an image on the display panel. To this end, at the time of the first loading, the timing controller 140 may perform a process of reading a set value from a memory such as an EEPROM. Therefore, the image may not be output onto the display until the timing controller 140 is completely loaded.

According to the configuration of FIG. 2, the timing controller 140 transmits the loading completed signal to the bridge integrated circuit 200 only after completely loading the timing controller, so that the timing controller controls the bridge integrated circuit 200 to convert the image. By doing this, an inconsistent sequence problem caused when the bridge integrated circuit 200 transmits the image data at a time when the timing controller 140 cannot process the image data may be solved. Specifically, when a size of the display panel is increased, jobs which need to be performed when the timing controller 140 is loaded are increased. In this case, when the sequence is not consistent with the bridge integrated circuit 200, it takes a lot of time to make the sequence consistent.

Therefore, when the exemplary embodiment of the present invention is applied, the bridge integrated circuit 200 is on standby until the timing controller 140 is ready to display the image. When a specific signal indicating that the timing controller 140 is ready to display an image is transmitted, the bridge integrated circuit 200 is controlled to convert and transmit an image. Further, image data which is transmitted by the bridge integrated circuit 200 before loading the timing controller 140 may cause a noise in the timing controller 140. When the exemplary embodiment of the present invention is applied, the noise is suppressed so that abnormal image may not be output onto the display panel.

In one or more embodiments of the present invention, the loading completed signal is transmitted and received between the timing controller 140 and the bridge integrated circuit 200 so that a sequence adjusting time between two devices may be shortened. Further, an accurate sequence is formed to increase a quality of an image which is output onto the display panel.

As an exemplary embodiment, when the loading completed signal is received from the timing controller 140 through the transceiver 230, the control unit 240 of the bridge integrated circuit 200 in the configuration of FIG. 2 controls the interface unit 210, the image converting unit 220, and the transceiver 230 to transmit the image to the timing controller.

As an exemplary embodiment, the controller 145 of the timing controller 140 in the configuration of FIG. 2 checks the status of the components to be controlled to control the transceiver 230 to transmit the loading completed signal to the bridge integrated circuit.

Figure 3:
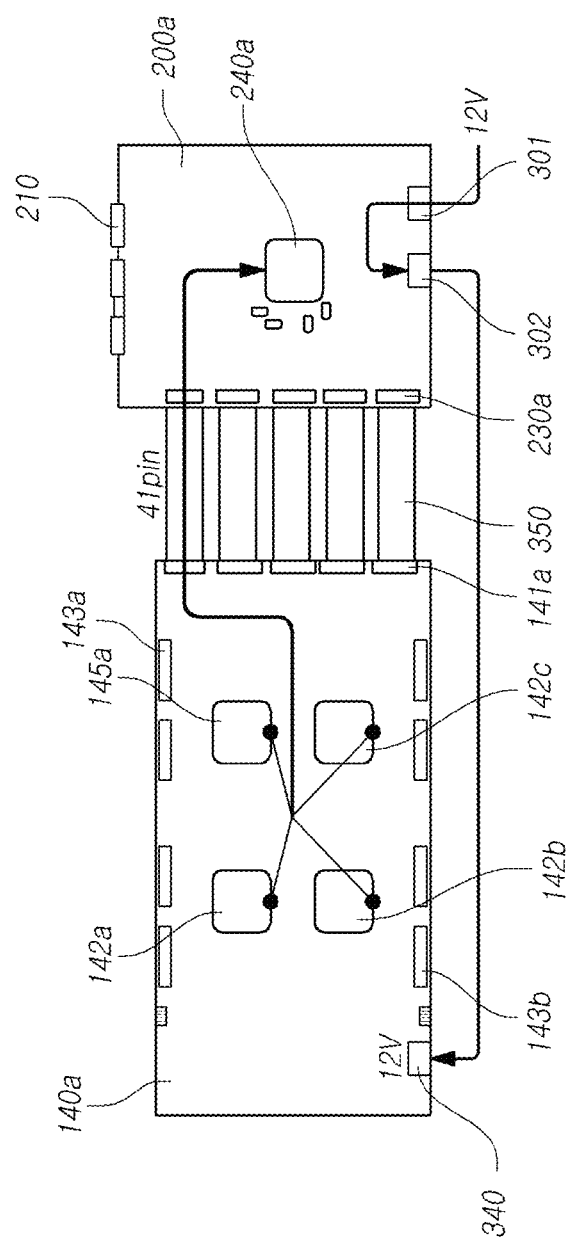
FIG. 3 is a view illustrating a configuration in which a loading completed signal is transmitted and received between a timing controller and a bridge integrated circuit according to an exemplary embodiment of the present invention.

FIG. 3 is a view illustrating a configuration in which a loading completed signal is transmitted and received between the timing controller and the bridge integrated circuit according to an exemplary embodiment of the present invention. In the configuration of FIG. 2, as an exemplary embodiment for configuring an integrated circuit, a timing controller 140a and a bridge integrated circuit 200a are illustrated.

As a configuration of the bridge integrated circuit 200a, an interface unit 210a, a transceiver 230a, and a control unit 240a are illustrated. A function of the image converting unit 220 illustrated in FIG. 3 is provided by the control unit 240a.

As a configuration of the timing controller 140a, a transceiver 141a, converting units 142a, 142b, and 142c, panel controllers 143a and 143b, and a control unit 145a are illustrated. The converting units 142a, 142b, and 142c convert images at an upper left corner, a lower left corner, and a lower right corner of the display panel. The control unit 145a converts an image of the upper right corner and controls other converting units 142a, 142b, and 142c and other components.

A cable 350 is disposed between the bridge integrated circuit 200a and the timing controller 140a and transmits signals between the transceiver 230a of the bridge integrated circuit 200a and the transceiver 141a of the timing controller 140a.

In the exemplary embodiment of the present invention, the control unit 145a of the timing controller 140a checks whether other components are completely loaded and then provides a loading completed signal, for example, a "T-con Done" signal to the bridge integrated circuit 200a through a specific pin (for example, a 41 pin) connected to the above-mentioned cable 350.

The bridge integrated circuit 200a operates in accordance with a received loading completed signal. After receiving the loading completed signal, the bridge integrated circuit 200a converts an image received from the host system and supplies the converted image to the timing controller 140a.

The above-mentioned cable 350 supplies 8K image data which is converted by the bridge integrated circuit 200a to the timing controller 140a.

This will be described in more detail below.

The display device according to an exemplary embodiment of the present invention is configured such that the bridge integrated circuit 200a converts image data (for example, 4K image data) supplied from the host system into 8K image data and supplies the converted 8K image data to the timing controller 140a. That is, the bridge integrated circuit 200a converts first image data which is received from the host system into second image data which can be processed by the timing controller, which is called up-scaling or stretching. The bridge integrated circuit 200a performs up-scaling through screen duplication or reinforces an edge to increase a sharpness or compensate the screen. The image is converted in the image converting unit 220. The up-scaling or stretching means that a size of image data which is received from the host system to be output in one frame is increased. For example, when an image signal for NxM sub pixels is received from a host, a size of the display panel which displays the image signal may be larger than NXM. The bridge integrated circuit 200a may up-scale or stretch the size of the display panel to be 2N×2M. As a result, a size of the image data (first image data) for one frame which is received from the host system by the bridge integrated circuit 200a may be different from a size of the image data (second image data) which is converted by the bridge integrated circuit 200a to be supplied to the display panel (timing controller). According to an exemplary embodiment, the size of the first image data may be smaller than the size of the second image data.

One or more image converting units 200 may be provided. The image data converted by the image converting unit 220 is image data which is output to the display panel by the timing controller 140a. Therefore, when the image data is transmitted and received between the timing controller 140a and the bridge integrated circuit 220a, a sequence needs to be controlled. When the exemplary embodiment of the present invention is applied, when the image data supplied from the host system is converted into image data which may be processed by the timing controller, a sequence between the bridge integrated circuit and the timing controller which is necessarily required is controlled after the operation of the timing controller. Therefore, inconsistency of the signal transmission and reception which is generated when the driving order of the timing controller and the bridge integrated circuit is not determined is solved. Further, noise image data is suppressed from being transmitted from the bridge integrated circuit to the timing controller.

Since the bridge integrated circuit 200a supplies compensated or converted image data to the timing controller 140a, it is required to adjust a sequence between the bridge integrated circuit 200a and the timing controller 140a.

In the configuration of FIG. 3, when the loading completed signal of the exemplary embodiment does not exist, the sequence between the timing controller 140a and the bridge integrate circuit 200a is not consistent so that abnormal phenomenon is caused, which generates a screen error.

According to the exemplary embodiment of the present invention, in order to solve the screen error, when each component of the timing controller 140a is completely loaded, a signal indicating that the timing controller 140a is ready to receive the image data, that is, a loading completed signal is transmitted to the bridge integrated circuit 200a. As a result, the bridge integrated circuit 220a may control a power sequence to be driven after receiving the loading completed signal.

When the bridge integrated circuit 200a is not configured to be driven in accordance with the loading completed signal of the present exemplary embodiment, a switching mode power supply (SMPS) may be repeatedly turned on/off until the sequence between the bridge integrated circuit 200a and the timing controller 140a is adjusted. A lot of time is required during this process. When the loading completed signal of the present exemplary embodiment is applied, the bridge integrated circuit 200a is driven after the timing controller 140a is completely loaded to supply image data. Therefore, there is no need to repeatedly turn off/off the SMPS.

As an exemplary embodiment, the loading completed signal generated in the timing controller may be 3.3 V. This signal is applied to the control unit 240a through any one of pins (for example, a 41 pin) of the above-mentioned cable 350 as an enable signal. The controller 240a of the bridge integrated circuit 200a may be driven in accordance with the loading completed signal which is applied as an enable signal.

In one example, 12 V which is an exemplary embodiment of the voltage which drives the display panel is applied to the timing controller 140a through the bridge integrated circuit 200a. The voltage is applied from a voltage input unit 301 of the bridge integrated circuit 200a to a power input unit 340 of the timing controller through a voltage output unit 302. The timing controller 140a supplies a signal indicating that the components thereof are completely loaded to the bridge integrated circuit 200a to be applied with 12 V to be driven. The bridge integrated circuit 200a operates by driving a power IC using 12 V so as to be driven in accordance with the received signal (for example, a T-con Done signal).

Figure 4:
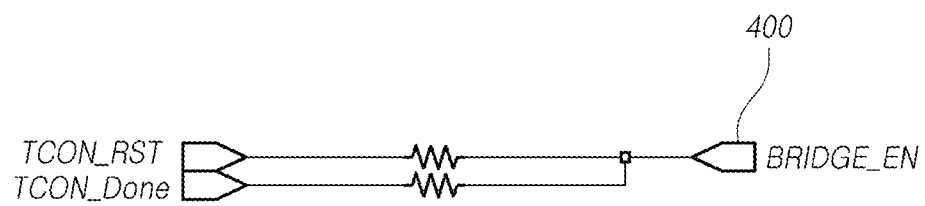
FIG. 4 is a view illustrating a configuration in which a timing controller according to an exemplary embodiment of the present invention supplies a loading completed signal.

FIG. 4 is a view illustrating a configuration in which a timing controller according to an exemplary embodiment of the present invention supplies a loading completed signal.

TCON_RST is a terminal indicating that the timing controller is reset and "T-con Done" is a terminal indicating that the timing controller is completely loaded". A signal which is connected between the two terminals is applied to a bridge enable BRIDGE_EN terminal 400. The bridge enable terminal 400 is an output terminal which is included in the transceiver 141a of the timing controller 140a. The loading completed signal from the output terminal may be connected to an input terminal of the bridge integrated circuit which will be described below through a cable. T-con Done which is applied with the loading completed signal usually maintains a specific value (for example, a low value). When the loading is completed, a contrary value (for example, a high value) to the value which is already maintained in T-con Done is applied to T-con-Done. Therefore, the bridge enable terminal confirms that the signal is changed to determine that the loading completed signal is applied. According to another exemplary embodiment, the T-con Done is controlled to be usually maintained to be high and to be applied with a low value when the loading is completed.

Figure 5:
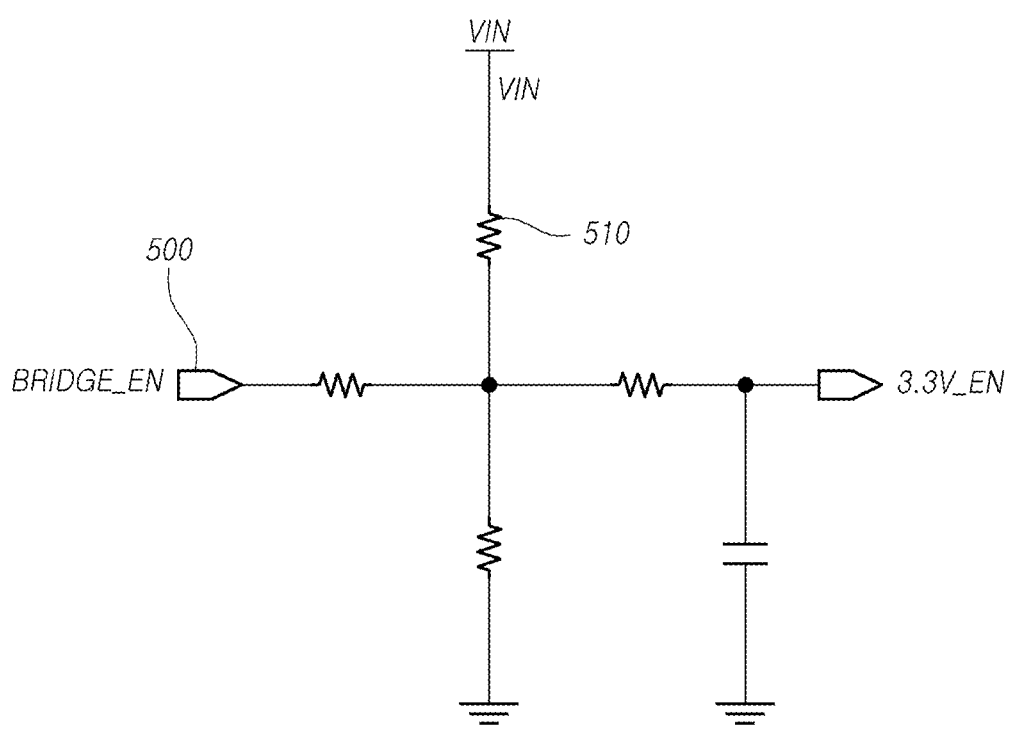
FIG. 5 is a view illustrating a configuration in which a bridge integrated circuit according to an exemplary embodiment of the present invention receives a loading completed signal.

Since the output terminal 400 is connected to the input terminal 500 of FIG. 5, the bridge integrated circuit may be driven by applying the loading completed signal. Therefore, when the output terminal of the present exemplary embodiment is used, the bridge integrated circuit may confirm that the timing controller is completely loaded without monitoring an operation of the timing controller using a separate processor. Therefore, a sequence between the timing controller and the bridge integrated circuit may be controlled.

A transceiver 141a which is one of transceivers of the timing controller 140a described above transmits the loading completed signal to the bridge integrated circuit 200a through a cable 350.

FIG. 5 is a view illustrating a configuration in which a bridge integrated circuit according to an exemplary embodiment of the present invention receives a loading completed signal.

A signal which is applied from the bridge enable (BRIDGE_EN) terminal of FIG. 4 is applied to the bridge enable (BRIDGE_EN) terminal 500 of the bridge integrated circuit 200a. The applied signal opens a first resistor 510 which is connected to VIN to which 12 V is connected to apply the signal to the 3.3 V_EN terminal.

The above-described transceivers 230 and 230a of FIGS. 2 and 3 include the bridge enable (BRIDGE_EN) input terminal. When the timing controller applies the loading completed signal to the input terminal 500, a power is applied to each of components (the control unit, the interface unit, the image converting unit, and the transceiver) of the bridge integrated circuits 200 and 200a of FIGS. 2 and 3. Here, when the loading completed signal is applied to the input terminal 500 of the transceiver without performing a separate process, as a result, the signal is applied to the 3.3 V_EN terminal to drive the bridge integrated circuit. Therefore when the output terminal of the present exemplary embodiment is used, the bridge integrated circuit may confirm that the timing controller is completely loaded without making the configuration of the bridge integrated circuit complex nor monitoring an operation of the timing controller using a separate processor. Therefore, a sequence between the timing controller and the bridge integrated circuit may be controlled.

As described with reference to FIG. 3, 12 V which is the exemplary embodiment of the voltage which drives the display panel is applied to the timing controller 140a through the bridge integrated circuit 200a. When the loading is completed to drive the timing controller 140a, a signal is applied to the bridge enable terminal of FIG. 4. This signal is applied to the bridge enable terminal of the bridge integrated circuit 200a of FIG. 4 through the cable of FIG. 3. Thereafter, the signal is applied to the 3.3 V_EN terminal to operate a power IC.

The above-described converting units 142a, 142b and 142c of the timing controller 140a of FIG. 3 are exemplary embodiments. The converting units 142a, 142b, and 142c and the control unit 145a may individually supply the loading completed signal. In this case, signals supplied from the plurality of converting units 142a, 142b, and 142c and the control unit 145a are combined in the T-con Done terminal of FIG. 4 to supply one loading completed signal. As another exemplary embodiment, a plurality of T-con Done signals is generated and a plurality of bridge enable terminals is disposed so that the plurality of T-con Done signals may be applied to the plurality of enable terminals of the bridge integrated circuit 200a.

Figure 6:
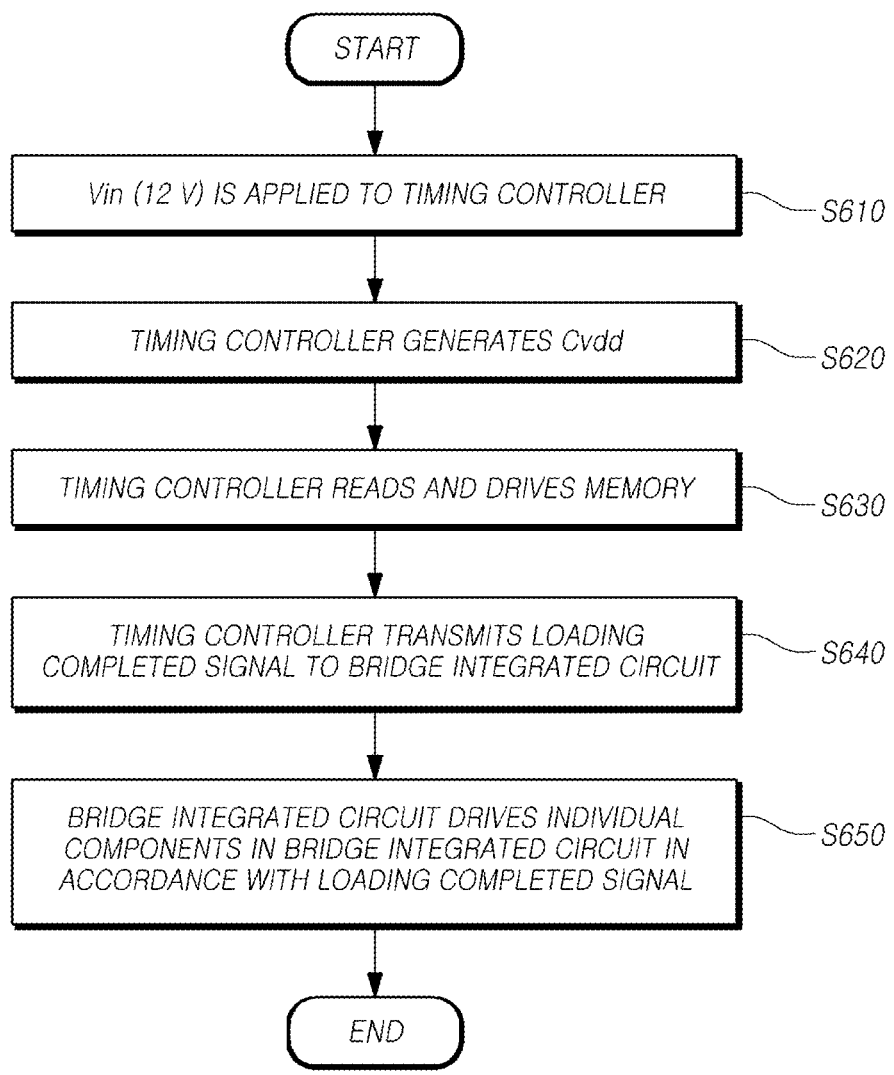
FIG. 6 is a view illustrating a process of operating a timing controller and a bridge integrated circuit according to an exemplary embodiment of the present invention.

FIG. 6 is a view illustrating a process of operating a timing controller and a bridge integrated circuit according to an exemplary embodiment of the present invention.

When Vin (12 V) which drives the display panel is applied to the timing controller in step S610, the timing controller generates Cvdd in step S620. Thereafter, the timing controller reads and drives a memory such as an EEPROM in step S630. The EEPROM includes all memories in which information required to drive the timing controller is stored. When the timing controller is successfully driven, the timing controller transmits a loading completed signal indicating that loading is completed to receive image data from the bridge integrated circuit to process the image data, for example, a "T-con Done" signal to the bridge integrated circuit in step S640. The bridge integrated circuit which receives the signal drives components in the bridge integrated circuit in accordance with the loading completed signal in step S650.

Through the driving of FIG. 6, when the loading completed signal (T-con Done" signal) supplied by the timing controller is applied to the bridge circuit through a specific signal pin (for example, a 41 pin) of the cable, a power of 3.3 V is enabled in the bridge integrated circuit to drive the bridge integrated circuit. Thereafter, the bridge integrated circuit converts an image which is received from the host system to supply the converted image to the timing controller. At this timing, in the timing controller, all components are completely loaded. Therefore, the sequence between the timing controller and the bridge integrated circuit is adjusted so that the image data is normally transmitted to the timing controller without turning on/off the SMPS.

Figure 7:
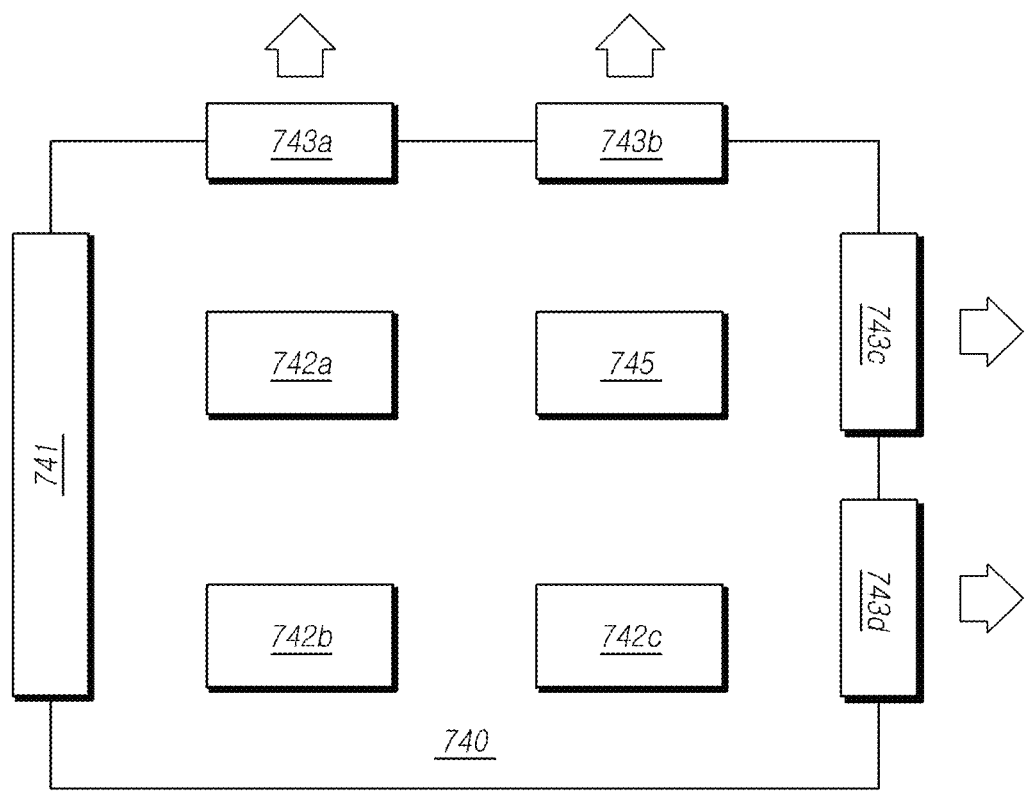
FIG. 7 is a view illustrating an operating process when a timing controller according to an exemplary embodiment of the present invention is configured by four converting units.

FIG. 7 is a view illustrating an operating process when a timing controller according to an exemplary embodiment of the present invention is configured by four converters. The same components as those described in FIG. 3 will be described in detail.

A timing controller 740 is configured by a transceiver 741 which receives image data from a bridge integrated circuit and transmits/receives the signal, converting units 742a, 742b, and 742c, a control unit 745, and panel controllers 743a, 743b, 743c, and 743d. The control unit 745 also has a function for converting the image data to be output to the display panel, like the converting units 742a, 742b, and 742c. Since a size of the display panel is increased and image data to be output to the display panel is increased, a plurality of converting units 742a, 742b, and 742c and a plurality of control units 745 may be included to efficiently process the image data. Further, a function of the control unit, like the control unit 745, is added to any one of the plurality of converting units to control the plurality of converting units. Of course, as the number of converting units is increased, a separate component which serves as a control unit may be included.

More specifically, the converting units 742a, 742b, 742c and the control unit 745 convert the image data to output the image data to each region of the display panel. For example, a first converting unit 742a converts image data to output an image to an upper left corner of the display panel. The first converting unit 742a applies a signal to a panel controller 743a which is connected to a first data driving unit and a panel controller 743c which is connected to a first gate driving unit. A second converting unit 742b converts image data to output an image to a lower left corner of the display panel. The second converting unit 742b applies a signal to the panel controller 743a which is connected to the first data driving unit and a panel controller 743d which is connected to a second gate driving unit. The control unit 745 which serves as a converting unit converts image data to output an image to an upper right corner of the display panel. The control unit 745 applies a signal to a panel controller 743b which is connected to a second data driving unit and the panel controller 743c which is connected to the first gate driving unit. A third converting unit 742c converts image data to output an image to a lower right corner of the display panel. The third converting unit 742c applies a signal to the panel controller 743a which is connected to the second data driving unit and a panel controller 743d which is connected to the second gate driving unit.

Further, the control unit 745 confirms whether the first to third converting units 742a, 742b, and 742c are completely loaded at an initial stage. When the loading is completed, this is transmitted to the transceiver 741 to indicate the bridge integrated circuit that the timing controller 740 is ready to receive the image data. The bridge integrated circuit is driven in accordance with the loading completed signal of the timing controller 740 to apply the image data to the timing controller 740. In the configuration in FIG. 7 the number of the converting units 742a, 742b, and 742c and controller 755 may be increased or decreased, but the present invention is not limited thereto. The controller 745 confirms the loading status of the panel controllers 743a, 743b, 743c, and 743d in addition to the converting units 742a, 742b, 742c, and 742d, to supply the loading completed signal to the bridge integrated circuit.

As illustrated in FIG. 7, when the plurality of converting units is included, it may take more time to load the converting units. Therefore, the bridge integrated circuit 200 may be controlled to be on standby until all of the plurality of components which configures the timing controller is capable of processing the image. That is, the bridge integrated circuit is on standby until the timing controller 740 is ready to display the image. When the bridge integrated circuit is indicated by a specific signal that the timing controller 140 is ready to display an image, the bridge integrated circuit 200 may convert and transmit the image. Specifically, image data which is transmitted by the bridge integrated circuit 200 before loading the timing controller 140 may cause a noise in the timing controller 740. When the exemplary embodiment of the present invention is applied, the noise is suppressed so that abnormal image is suppressed from being output onto the display panel.

FIG. 8 is a view illustrating timing between a timing controller and a bridge integrated circuit according to an exemplary embodiment of the present invention. When a power is applied, the timing controller loads each of the components in step S810. More specifically, when an input voltage is applied to the timing controller, the timing controller reads out information of the memory to load the panel controller and the converting unit. When each component is completely loaded, a control unit of the timing controller receives a signal indicating that the loading is completed from the panel controller and the converting unit and the timing controller transmits the received loading completed signal to the bridge controller in step S820.

After receiving the loading completed signal, the bridge controller is loaded in step S830. When the loading is completed, the bridge controller starts converting the image data in step S840. More specifically, the bridge controller converts first image data which is received from the host system into second image data and transmits the converted second image data. As an exemplary embodiment, the bridge controller converts 4K image data into 8K image data to transmit the 8K image data to the timing controller.

The timing controller converts the received image data (converted second image data) into a voltage which may be output to the display panel in step S850 to supply the voltage to the panel controller in step S860. Here, the panel controller applies the converted voltage to the data driving unit of the display panel and applies a gate signal to the gate driving unit so that the display panel displays the image data.

When the present exemplary embodiment is applied, the bridge integrated circuit is on standby until the timing controller is ready to display an image, that is, the bridge integrated circuit receives the loading completed signal in step S820. When a specific signal (a loading completed signal such as "T-con Done") indicates that the timing controller 140 is ready to display an image), the bridge integrated circuit is loaded in step S830 and then converts and transmits the image data as performed in step S840.

Further, image data which is transmitted by the bridge integrated circuit before loading the timing controller may cause a noise in the timing controller. However, when the present exemplary embodiment is applied, the bridge integrated circuit is controller not to convert/transmit separate image data before step S830. Therefore, the above-mentioned noise is suppressed and an abnormal image is suppressed from being output onto the display panel.

In FIG. 8, steps S810 to S830 are initial processes of the timing controller and the bridge integrated circuit. Thereafter, steps S840 to S860 (a section 890) are repeated to output an image.

It will be appreciated that technical spirit of the present invention have been described herein for purposes of illustration by the above description and the accompanying drawings, and that combination, separation, substitution, and modifications of components may be made by those skilled in the art without departing from the scope and spirit of the present invention. Therefore, the exemplary embodiments of the present invention are provided for illustrative purposes only but not intended to limit the technical concept of the present invention. The scope of the technical concept of the present invention is not limited thereto. The protective scope of the present invention should be construed based on the following claims, and all the technical concepts in the equivalent scope thereof should be construed as falling within the scope of the present invention.

What is claimed is:

1. A bridge integrated circuit, comprising:
    an interface unit which receives first image data from a host system;
    an image converting unit which converts the first image data into second image data;
    a transceiver which transmits the second image data to a timing controller, and transmits and receives a signal to and from the timing controller; and
    a control unit which, when the transceiver receives a loading completed signal from the timing controller, controls the interface unit, the image converting unit, and the transceiver to transmit the second image data to the timing controller,
    wherein the loading completed signal is generated by the timing controller.

2. The bridge integrated circuit according to claim 1, wherein the transceiver includes one or more input terminals, and when the loading completed signal is applied from the timing controller to the input terminal, a power is applied to the control unit, the interface unit, the image converting unit, and the transceiver.

3. The bridge integrated circuit according to claim 1, wherein a size of the first image data is smaller than a size of the second image data.

4. A timing controller, comprising:
    a transceiver which receives image data from a bridge integrated circuit and transmits and receives a signal to and from the bridge integrated circuit;
    a converting unit which converts the image data into panel image data to be output onto a display panel;
    a panel controller which transmits a gate control signal and a data control signal to a gate driving unit and a data driving unit, respectively, to output the panel image data converted in the converting unit onto the display panel; and
    a control unit which controls the transceiver, the converting unit, and the panel controller,
    wherein the control unit checks statuses of the transceiver, the converting unit, and the panel controller to control the transceiver to transmit a loading completed signal to the bridge integrated circuit, and
    wherein the transceiver includes one or more output terminals and the control unit applies the loading completed signal through the output terminals.

5. The timing controller according to claim 4, wherein a plurality of converting units is provided and any one of the converting units is included in the control unit.

6. The timing controller according to claim 5, further comprising:
    a first converting unit which converts image data which is output to an upper left corner of the display panel;
    a second converting unit which converts image data which is output to a lower left corner of the display panel;
    a third converting unit which converts image data which is output to a lower right corner of the display panel; and
    a fourth converting unit which converts image data which is output to an upper right corner of the display panel,
    wherein the control unit generates the loading completed signal when all the first to fourth converting units are completely loaded and the control unit includes one of the first to fourth converting units.

7. A method of driving a timing controller and a bridge integrated circuit, the method comprising:
    reading out information of a memory to load a panel controller and a converting unit when an input voltage is applied to the timing controller;

receiving, by a control unit of the timing controller, a signal indicating that the loading is completed, from the panel controller and the converting unit;
transmitting, by the timing controller, the received loading completed signal to a bridge controller;
loading the bridge controller;
converting first image data which is received from a host system by the bridge controller into second image data to transmit the second image data to the timing controller;
after the converting,
converting, by the converting unit of the timing controller, the second image data into a voltage which is output to a display panel to supply the voltage to the panel controller; and
applying, by the panel controller, the converted voltage to a data driving unit of the display panel and applying a gate signal to a gate driving unit of the display panel.

* * * * *